United States Patent
Okamura et al.

(10) Patent No.: US 12,408,586 B2
(45) Date of Patent: Sep. 9, 2025

(54) ELECTRIC WORK MACHINE

(71) Applicant: MAKITA CORPORATION, Anjo (JP)

(72) Inventors: Masayuki Okamura, Anjo (JP);
Kazuya Okuma, Anjo (JP)

(73) Assignee: MAKITA CORPORATION, Anjo (JP)

( * ) Notice: Subject to any disclaimer, the term of this patent is extended or adjusted under 35 U.S.C. 154(b) by 556 days.

(21) Appl. No.: 17/960,530

(22) Filed: Oct. 5, 2022

(65) Prior Publication Data

US 2023/0115229 A1    Apr. 13, 2023

(30) Foreign Application Priority Data

Oct. 13, 2021    (JP) .................................. 2021-168021

(51) Int. Cl.
*A01D 34/78*    (2006.01)
*A01D 101/00*    (2006.01)
*A01D 34/68*    (2006.01)

(52) U.S. Cl.
CPC ...... *A01D 34/78* (2013.01); *A01D 2034/6843* (2013.01); *A01D 2101/00* (2013.01)

(58) Field of Classification Search
CPC . A01D 34/78; A01D 2101/00; A01D 34/6806
See application file for complete search history.

(56) References Cited

U.S. PATENT DOCUMENTS

| | | | |
|---|---|---|---|
| 2008/0216458 A1* | 9/2008 | Lucas | H02P 4/00 56/10.6 |
| 2009/0266042 A1* | 10/2009 | Mooney | B60L 50/52 56/14.7 |
| 2010/0275564 A1* | 11/2010 | Baetica | A01D 34/37 429/96 |

(Continued)

FOREIGN PATENT DOCUMENTS

| | | | |
|---|---|---|---|
| JP | 2013099037 A | 5/2013 | |
| JP | 2014233127 A | 12/2014 | |

(Continued)

OTHER PUBLICATIONS

Mar. 11, 2025 Office Action issued in Japanese Patent Application No. 2021-168021.

(Continued)

*Primary Examiner* — Kito R Robinson
*Assistant Examiner* — Roy Rhee
(74) *Attorney, Agent, or Firm* — Oliff PLC

(57) ABSTRACT

An electric work machine includes a first and second motors; a first and second switches disposed on corresponding current conduction path from a direct-current power source to each motor; a first and second carrier frequency setting devices; and a controller. The first and second carrier frequency setting devices respectively set a first and second carrier frequencies of a time when PWM controlling an electric power supply to the first and second motors. The first and second carrier frequencies are different from each other. The controller drives the first switch or the second switch by using a PWM signal generated at the first or second carrier frequency and PWM controls an electric power supply to the first or second motor.

9 Claims, 10 Drawing Sheets

(56) References Cited

U.S. PATENT DOCUMENTS

| | | |
|---|---|---|
| 2013/0107579 A1 | 5/2013 | Hosotani et al. |
| 2014/0376274 A1 | 12/2014 | Hosotani et al. |
| 2018/0091079 A1 | 3/2018 | Kashima et al. |
| 2021/0169000 A1 | 6/2021 | Yamagishi et al. |

FOREIGN PATENT DOCUMENTS

| | | |
|---|---|---|
| JP | 2019022119 A | 2/2019 |
| WO | 2013/146338 A1 | 3/2013 |
| WO | 2016/194537 A1 | 12/2016 |
| WO | 2017/022084 A1 | 2/2017 |
| WO | 2019/097683 A1 | 5/2019 |

OTHER PUBLICATIONS

Jun. 24, 2025 Office Action issued in Japanese Patent Application No. 2021-168021.

\* cited by examiner

ELECTRIC WORK MACHINE

CROSS-REFERENCE TO RELATED APPLICATIONS

This application claims the benefit of Japanese Patent Application No. 2021-168021 filed Oct. 13, 2021 in the Japan Patent Office, the entire disclosure of which is incorporated herein by reference.

BACKGROUND

The present disclosure relates to an electric work machine.

International Patent Application Publication No. 2019/097683 (hereinafter, Patent Document 1) discloses a lawn mower that includes an operation motor, a travel motor, and a controller. In this lawn mower, the operation motor is a motor for driving a cutting blade, and the travel motor is a motor for causing the lawn mower to travel (self-travel). The controller includes a computer in which a processor executes a program stored in a memory to control a rotational speed of the operation motor and a rotational speed of the travel motor.

SUMMARY

A rotational speed of a motor is controlled by turning on and off a switching element disposed on a current conduction path to the motor by using a pulse-width modulated (PWM) control signal (PWM signal). If a carrier frequency, which determines a cycle of PWM control, is high, the operation motor sometimes brings about a failure of switching element caused by overheating due to switching losses. It is thus required to reduce the carrier frequency to reduce the number of times of switching. Meanwhile, it is required to increase the carrier frequency of the travel motor to stabilize the torque (in other words, the rotational speed of the motor) since the lawn mower travels unstably to decrease its usability when torque fluctuation occurs.

However, the lawn mower disclosed in Patent Document 1 includes one controller to control both the operation motor and the travel motor. As both motors are controlled by a common controller, the carrier frequency of a time when PWM controlling each motor becomes the same. Accordingly, the lawn mower disclosed in Patent Document 1 has a problem that it is not possible to set an appropriate carrier frequency for each motor to control the rotational speed of each motor.

In one aspect of the present disclosure, it is desirable that, in an electric work machine having two motors, a common controller for the two motors can control an electric power supply to each motor by using PWM signals having different carrier frequencies.

Means for Solving the Problems

An electric work machine in one aspect of the present disclosure includes a first motor, a second motor, a first current conduction path, a second current conduction path, a first switch, a second switch, a first carrier frequency setting device, a second carrier frequency setting device, and a controller.

The first motor is configured to drive a first drive object. The second motor is configured to drive a second drive object. In other words, the first motor and the second motor drive different drive objects.

The first current conduction path is configured to couple a direct-current power source to the first motor. The second current conduction path is configured to couple the direct-current power source to the second motor. A first switch is disposed on the first current conduction path. A second switch is disposed on the second current conduction path.

The first carrier frequency setting device is configured to set a first carrier frequency of a time when PWM controlling an electric power supply to the first motor by turning on and off the first switch. The second carrier frequency setting device is configured to set a second carrier frequency of a time when PWM controlling an electric power supply to the second motor by turning on and off the second switch such that the second carrier frequency is different from the first carrier frequency.

The controller is configured to control an electric power supply to the first motor by generating a first PWM signal at the first carrier frequency and delivering the first PWM signal to the first switch in response to an input of a first motor drive command. The controller is also configured to control an electric power supply to the second motor by generating a second PWM signal at the second carrier frequency and delivering the second PWM signal to the second switch in response to an input of a second motor drive command.

As described above, in the aforementioned electric work machine, the electric power supplies to the first motor and the second motor are PWM controlled by the first PWM signal and the second PWM signal that are respectively generated at the first carrier frequency and the second carrier frequency having different frequencies.

Accordingly, in the aforementioned electric work machine, even though the first motor and the second motor are driven by a common controller, the carrier frequency of a time when PWM controlling the electric power supply to the first motor and the second motor can be set individually for each motor. Therefore, the electric power supply to the first motor and the second motor can be PWM controlled individually at the carrier frequency suitable for each motor.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Embodiment

Figure 1:
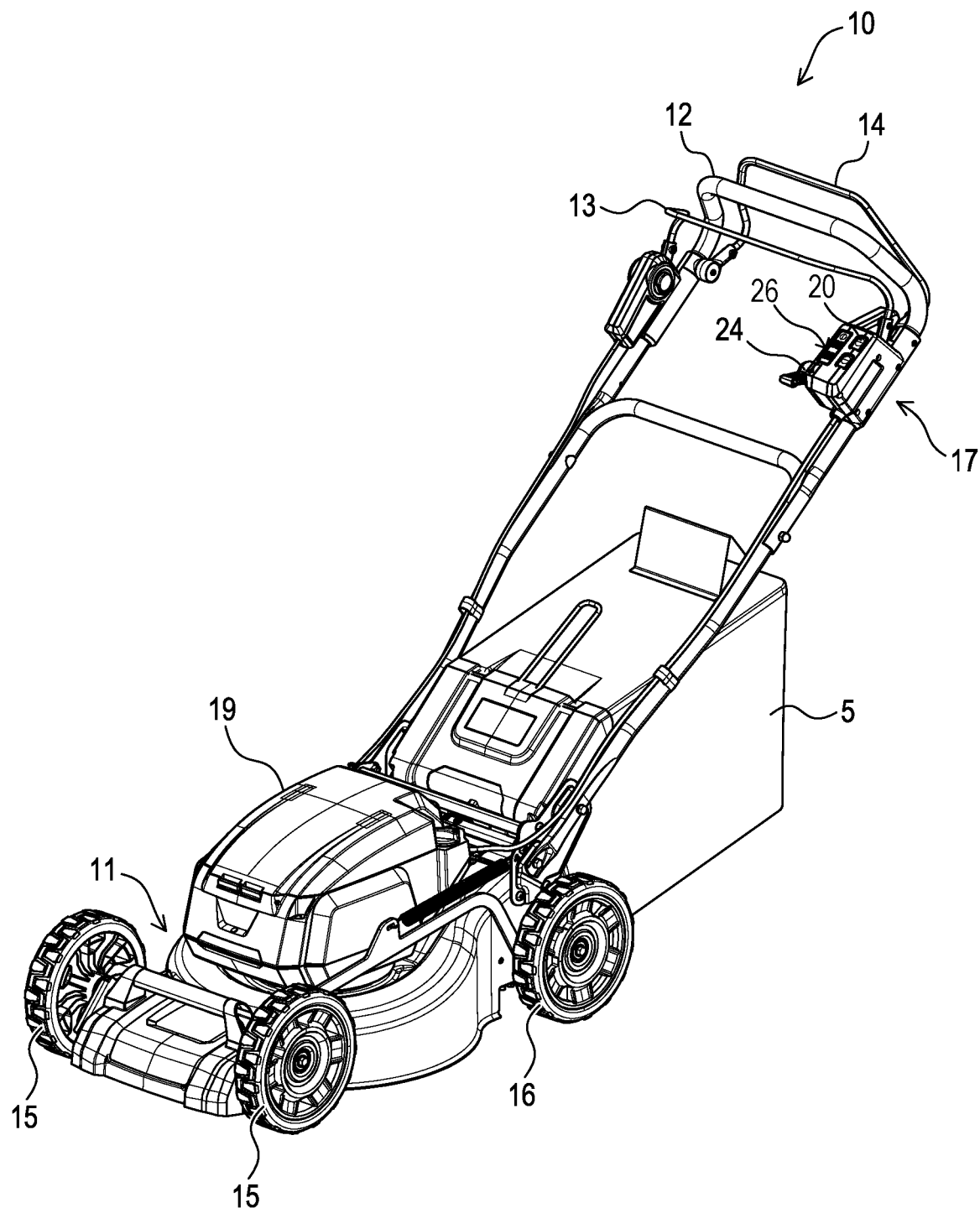
FIG. 1 is a perspective view showing an external appearance of a lawn mower in an embodiment.

An electric work machine of the present embodiment may include a first motor configured to drive a first drive object. The first motor may include a first current conduction path configured to couple a direct-current power source to the first motor. A first switch may be disposed on the first current conduction path.

In addition or alternatively, the electric work machine may include a second motor configured to drive a second drive object. The second motor may include a second current conduction path configured to couple the direct-current power source to the second motor. A second switch may be disposed on the second current conduction path.

In addition or alternatively, the electric work machine may include a first carrier frequency setting device configured to set a first carrier frequency of a time when PWM controlling an electric power supply to the first motor by turning on and off the first switch. The electric work machine may also include a second carrier frequency setting device configured to set a second carrier frequency of a time when PWM controlling an electric power supply to the second motor by turning on and off the second switch such that the second carrier frequency is different from the first carrier frequency.

In addition or alternatively, the electric work machine may include a controller that controls the electric power supply to the first motor by generating a first PWM signal at the first carrier frequency and delivering the generated first PWM signal to the first switch in response to an input of a first motor drive command.

This controller may also be configure to control the electric power supply to the second motor by generating a second PWM signal at the second carrier frequency and delivering the generated second PWM signal to the second switch in response to an input of a second motor drive command.

An electric work machine including the first motor, the second motor, the first current conduction path, the second current conduction path, the first switch, the second switch, the first carrier frequency setting device, the second carrier frequency setting device, and the controller described above may set the first carrier frequency for PWM controlling the electric power supply to the first motor to a carrier frequency suitable to control the first motor and may set the second carrier frequency for PWM controlling the electric power supply to the second motor to a carrier frequency suitable to control the second motor.

For example, in a case where a load applied from the first drive object to the first motor is large and thus the electric power supply to the first motor is large, the first carrier frequency may be set to a frequency that is lower than the second carrier frequency. By thus setting the first carrier frequency, switching losses generated in the first switch can be reduced, which can inhibit the first switch from going into an overheated state.

In this case, it is not necessary to increase a dielectric withstanding voltage of the first switch to protect the first switch from failure caused by overheating. This makes it possible to select a switching element having a low dielectric withstanding voltage as the first switch. Accordingly, the cost of the electric work machine can be reduced.

In this case, the second carrier frequency may be set higher than the first carrier frequency. This makes it possible to reduce torque fluctuation of the second motor and drive the second drive object stably at a desired speed.

In addition or alternatively, in the electric work machine, the first carrier frequency may be set lower than the second carrier frequency. The first drive object may be a blade. The first motor may be configured to rotate the blade. The second drive object may be a wheel that enables the electric work machine to travel. The second motor may be configured to rotate the wheel.

In the first motor, a load generated by driving the blade increases when operating the electric work machine. The first switch is therefore likely to generate heat because of switching losses caused by being periodically turned on and off by PWM control. However, such heat generation can be inhibited by setting the first carrier frequency lower than the second carrier frequency as mentioned above.

In a case where the second motor has a low carrier frequency, torque fluctuation (in other words, rotational fluctuation) is likely to occur in the second motor because of a load generated by driving the wheel. Such torque fluctuation can be inhibited by increasing the second carrier frequency. This stabilizes the travelling speed of the electric work machine when self-travelling and enables a reduction of uncomfortableness felt by the user due to speed fluctuation.

In addition or alternatively, the first carrier frequency of the electric work machine may be set within a range between 100 Hz and 1 kHz; and the second carrier frequency may be set within a range between 8 kHz and 20 kHz.

The electric work machine having the first carrier frequency or the second carrier frequency set as specified above can reduce a switching noise to be heard by the user when PWM controlling the electric power supply to the first motor and/or when PWM controlling the electric power supply to the second motor.

Generally, in a case where the carrier frequency of the PWM control is set within a range between 1 kHz and 8 kHz, the switching noise generated by turning on and off the switches becomes an audible noise that can be heard by a person in the surroundings and may give uncomfortableness to the users and others.

However, if the first carrier frequency or the second carrier frequency is set as specified above, it is possible to reduce the switching noise generated when PWM controlling the electric power supply to the motors, which enables a reduction of uncomfortableness felt by the user.

More preferably, the first carrier frequency may be set within a range between 300 Hz and 700 Hz; and the second carrier frequency may be set within a range between 8 kHz and 10 kHz.

In addition or alternatively, the first switch and/or the second switch may be configured such that a turn-off time, during which the state of the switch changes from ON-state to OFF-state by a first PWM signal and/or a second PWM signal, is longer than a turn-on time, during which the state of the switch changes from OFF-state to ON-state.

The electric work machine configured as described above can reduce a high-value peak voltage that is generated by energy accumulated in the first motor or in the second motor when the first switch or the second switch is turned off. As a result, it is possible to inhibit the first switch or the second switch from being deteriorated due to a high voltage that is generated when the first switch or the second switch is turned off.

The aforementioned features may be combined in any ways as another embodiment. One or some of the aforementioned features may be deleted as yet another embodiment.

Specific Example Embodiment

Hereinafter, example embodiments of the present disclosure will be explained with reference to the drawings. In the present embodiment, a lawn mower 10 will be explained as an example of the electric work machine.

<Overall Configuration of Lawn Mower>

As shown in FIG. 1, the lawn mower 10 of the present embodiment includes a vehicle body 11. The lawn mower 10 also includes a battery connector 19 above the vehicle body 11. The battery connector 19 includes a lid. The battery connector 19 is configured so that two or more battery packs 6 (see FIG. 2) can be attached thereto or detached therefrom inside the lid. Each battery pack 6 include a rechargeable battery 8. The battery 8 is one example of a direct-current power source in the present disclosure.

The lawn mower 10 includes a grass collector 5. The grass collector 5 is attached to the rear of the vehicle body 11.

The lawn mower 10 includes a handle 12. The handle 12 has a U-shaped form and is attached to the vehicle body 11. The handle 12 is configured to be held by the user. The user holds the handle 12, walk behind the lawn mower 10, and controls the lawn mower 10 via the handle 12.

The lawn mower 10 includes a first control lever 13 and a second control lever 14 for the user to control. These two control levers 13, 14 have U-shaped forms to correspond to the shape of the handle 12. The first control lever 13 is situated in front of the handle 12. The second control lever 14 is situated in the rear of the handle 12.

The first control lever 13 is attached to the handle 12 so that the user can pull the first control lever 13 towards the handle 12 (in other words, towards the rear). The second control lever 14 is attached to the handle 12 so that the user can push the second control lever 14 towards the handle 12 (in other words, towards the front).

Figure 2:
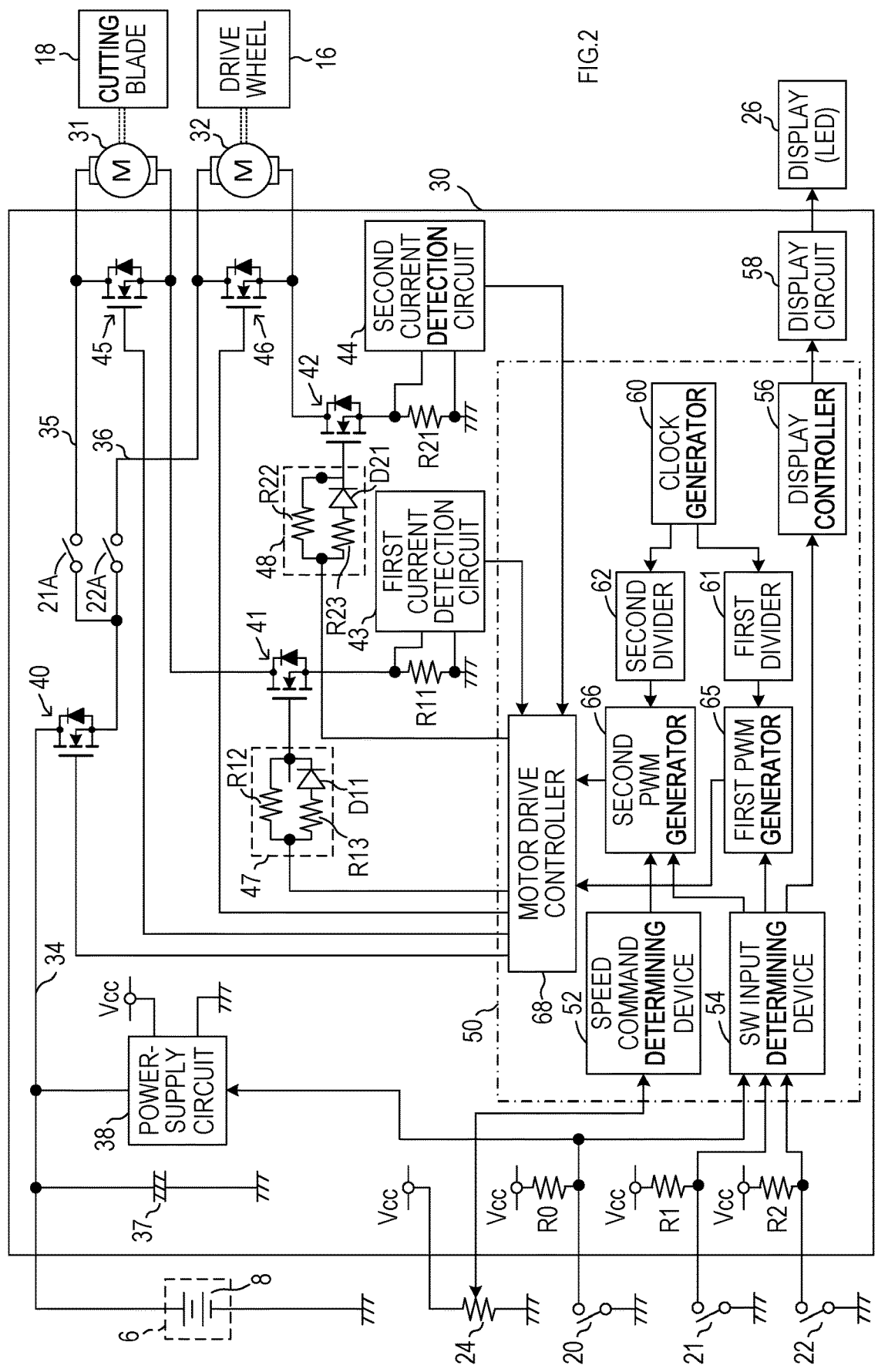
FIG. 2 is a block diagram showing an electrical configuration of the lawn mower.

The lawn mower 10 includes a cutting blade 18 (see FIG. 2). The cutting blade 18 is disposed on a bottom surface of the vehicle body 11. The lawn mower 10 includes a blade motor 31 (see FIG. 2). The blade motor 31 is disposed inside the vehicle body 11. A rotational shaft of the blade motor 31 is physically coupled to the cutting blade 18 directly or via a transmitting device.

The blade motor 31 is a motor for driving the cutting blade 18 for mowing the lawn grasses. The cutting blade 18 rotates in response to receiving a driving force from the blade motor 31. The lawn grasses mown by the rotation of the cutting blade 18 is collected inside the grass collector 5.

The lawn mower 10 includes a pair of right and left drive wheels 16. The pair of drive wheels 16 is disposed in the rear of the vehicle body 11. The lawn mower 10 includes a pair of right and left driven wheels 15. The pair of driven wheels 15 is disposed in the front of the vehicle body 11.

The lawn mower 10 includes a self-travel motor 32 inside the vehicle body 11 (see FIG. 2). A rotational shaft of the self-travel motor 32 is physically coupled to the pair of drive wheels 16 via a transmitting device. The self-travel motor 32 is a motor for driving the pair of drive wheels 16. The pair of drive wheels 16 rotates in response to receiving a drive force from the self-travel motor 32 and cause the lawn mower 10 to self-travel towards the front.

The blade motor 31 corresponds to one example of the first motor in the present disclosure. The cutting blade 18 is a blade in the present disclosure and corresponds to one example of the first drive object. The self-travel motor 32 corresponds to one example of the second motor in the present disclosure. The drive wheels 16 are one example of the second drive object in the present disclosure. In the present embodiment, the blade motor 31 and the self-travel motor 32 may be brushed motors.

Among the two control levers 13, 14, the first control lever 13 is a control lever for driving or stopping the blade motor 31; and the second control lever 14 is a control lever for driving or stopping the self-travel motor 32.

The first control lever 13 includes a blade switch 21 (see FIG. 2) as a switch for driving the blade motor 31. The blade switch 21 turns to ON-state when the first control lever 13 is pulled towards the handle 12 (in other words, towards the rear).

The second control lever 14 includes a self-travel switch 22 (see FIG. 2) as a switch for driving the self-travel motor 32. The self-travel switch 22 turns to ON-state when the second control lever 14 is pushed towards the handle 12 (in other words, towards the front).

The first control lever 13 and the second control lever 14 are attached to the handle 12 such that they return to their original position when released by the user. Accordingly, when the first control lever 13 is pulled, the blade switch 21 returns to OFF-state if the user releases the first control lever 13. Similarly, when the second control lever 14 is pushed, the self-travel switch 22 returns to OFF-state if the user releases the second control lever 14.

The lawn mower 10 includes an operation device 17. The operation device 17 is attached to the handle 12. The operation device 17 includes a main power switch 20. The main power switch 20 is a tactile switch that turns to ON-state only when the user is manipulating (pressing) the switch.

The operation device 17 also includes a display 26 that displays state of the lawn mower 10. The display 26 includes LEDs for various different displays. The LEDs of the display 26 include, for example, a main power LED that is turned on when electric power is supplied to a controller 30 in response to a manipulation of the main power switch 20 as shown in FIG. 2. The LEDs of the display 26 also include a remaining energy display LED that shows electric energy accumulated in the battery 8 (hereinafter referred to as remaining energy), and a malfunction display LED that is turned on when the driving system of the blade motor 31 and/or the self-travel motor 32 is malfunctioning.

The operation device 17 also includes a speed adjusting dial 24 for adjusting travelling speeds of the aforementioned blade switch 21, the self-travel switch 22, and the lawn mower 10. As shown in FIG. 2, the speed adjusting dial 24 includes a variable resistor, a resistance value of which varies depending on the position of the speed adjusting dial 24 controlled by the user. The controller 30 is configured to transmit (generate) a command with respect to the travelling speed in accordance with the resistance value.

<Configuration of Controller>

The controller 30 drives the blade motor 31 and the self-travel motor 32 and controls the display of various different LEDs arranged on the display 26. The controller 30 is disposed on a single circuit board and stored inside the vehicle body 11. Hereinafter, an electric configuration of the controller 30 will be explained with reference to FIG. 2.

As shown in FIG. 2, the controller 30 is electrically coupled to the battery 8, the blade motor 31, and the self-travel motor 32. The controller 30 includes a first current conduction path 35, a second current conduction path 36, and a third current conduction path 34. The first current conduction path 35 and the third current conduction path 34 couple the battery 8 to the blade motor 31. The third current conduction path 34 and the second current conduction path 36 couple the battery 8 to the self-travel motor 32. This enables electric power supplies from the battery 8 to the blade motor 31 and to the self-travel motor 32.

The first current conduction path 35 and the second current conduction path 36 are respectively dedicated for the blade motor 31 and the self-travel motor 32. The first current conduction path 35 is coupled to two terminals of the blade motor 31, and the second current conduction path 36 is coupled to two terminals of the self-travel motor 32. A first terminal of these two terminals of the blade motor 31 is coupled to a positive side of the battery 8, and a second terminal of these two terminals is coupled to a negative side of the battery 8 (which is the ground in FIG. 2). The two terminals of the self-travel motor 32 are arranged likewise. The third current conduction path 34 is a common current conduction path for the blade motor 31 and the self-travel motor 32 that couples the positive side terminal battery 8 to the first current conduction path 35 and the second current conduction path 36.

The third current conduction path 34 has a third switching element 40 arranged thereon. The third switching element 40 completes and interrupts the third current conduction path 34. The third switching element 40 is an re-channel type metal-oxide semiconductor field-effect transistor (hereinafter, referred to as MOSFET). Accordingly, the third switching element 40 completes the third current conduction path 34 by turning to ON-state in response to an input of a high-level drive signal into its gate from the control circuit 50.

On a part of the first current conduction path 35 that couples the terminal of the blade motor 31 to the negative side of the battery 8, a first switching element 41 that completes and interrupts the first current conduction path 35 is disposed. On a part of the second current conduction path 36 that couples the terminal of the self-travel motor 32 to the negative side of the battery 8, a second switching element 42 that completes and interrupts the second current conduction path 36 is disposed.

The first and the second switching elements 41, 42 are n-channel type MOSFET like the third switching element 40. Accordingly, the first and the second switching elements 41, 42 respectively complete the first current conduction path 35 and the second current conduction path 36 by turning to ON-state in response to an input of a high-level drive signal into their gates from the control circuit 50.

When driving the blade motor 31 or the self-travel motor 32, the control circuit 50 generates a PWM signal having a specific duty ratio at a carrier frequency set for each of the blade motor 31 and the self-travel motor 32. The control circuit 50 then delivers thus generated PWM signal to the first and the second switching elements 41, 42, which are respectively corresponding to the blade motor 31 and the self-travel motor 32, to turn on and off the first and the second switching elements 41, 42. As a consequence, electric power supply to the blade motor 31 and the self-travel motor 32 is PWM controlled.

The first switching element 41 corresponds to one example of the first switch in the present disclosure. The PWM signal delivered from the control circuit 50 to the first switching element 41 corresponds to one example of the first PWM signal in the present disclosure. The second switching element 42 corresponds to one example of the second switch in the present disclosure. The PWM signal delivered from the control circuit 50 to the second switching element 42 corresponds to one example of the second PWM signal in the present disclosure.

A resistor R11 is arranged on a part of the first current conduction path 35 between the first switching element 41 and the negative side of the battery 8. A resistor R21 is arranged on a part of the second current conduction path 36 between the second switching element 42 and the negative side of the battery 8. These resistors R11, R21 are current detection resistors for detecting motor current flowing through the blade motor 31 and the self-travel motor 32. The resistor R11 includes a first current detection circuit 43 for detecting the motor current that flowed to the blade motor 31 from a voltage across the resistor R11. The resistor R21 includes a second current detection circuit 44 for detecting the motor current that flowed to the self-travel motor 32 from a voltage across the resistor R21.

Detection signals from the first current detection circuit 43 and the second current detection circuit 44 are input to the control circuit 50. The control circuit 50 monitors the motor current flowed to the blade motor 31 when the blade motor 31 is driven based on the detection signal delivered from the first current detection circuit 43. The control circuit 50 also monitors the motor current flowed to the self-travel motor 32 when the self-travel motor 32 is driven based on the detection signal delivered from the second current detection circuit 44.

If the motor current monitored by the control circuit 50 exceeds a preset electric current threshold, then the control circuit 50 determines that a driving system of the blade motor 31 or the self-travel motor 32 is malfunctioning and turns the third switching element 40 from ON-state to OFF-state to interrupt the third current conduction path 34. As a consequence, the blade motor 31 and the self-travel motor 32 are protected from overcurrent.

The first current conduction path 35 includes a fourth switching element 45 arranged in parallel with the blade motor 31. The second current conduction path 36 includes a fifth switching element 46 arranged in parallel with the self-travel motor 32.

The fourth and the fifth switching elements 45, 46 are n-channel type MOSFET like the first to the third switching elements 40, 41, 42. Accordingly, the fourth and the fifth switching elements 45, 46 respectively short circuits both ends of the blade motor 31 and the self-travel motor 32 by turning to ON-state in response to an input of a high-level brake signal into their gates from the control circuit 50.

Consequently, if the first switching element 41 is turned to OFF-state and the fourth switching element 45 is turned to ON-state when the blade motor 31 is rotating, a brake current flows through the fourth switching element 45 which causes generation of a damping torque in the blade motor 31. If the second switching element 42 is turned to OFF-state and the fifth switching element 46 is turned to ON-state when the self-travel motor 32 is rotating, a brake current flows through the fifth switching element 46 which causes generation of the damping torque in the self-travel motor 32. In other words, the fourth and the fifth switching elements 45, 46 are short circuit brake switches that generate a braking force in the blade motor 31 and the self-travel motor 32 to stop their rotation.

A drive switch 21A of the blade motor 31 is disposed on a part of the first current conduction path 35 between the blade motor 31 and the fourth switching element 45, and the positive side of the battery 8. The drive switch 21A is turned on and off in conjunction with the blade switch 21. A drive switch 22A of the self-travel motor 32 is disposed on a part of the second current conduction path 36 between the self-travel motor 32 and the fifth switching element 46, and the positive side of the battery 8. The drive switch 22A is turned on and off in conjunction with the self-travel switch 22.

The drive switch 21A completes the current conduction path 35 when the drive command of the blade motor 31 is input in response to the blade switch 21 being turned to ON-state. The drive switch 22A completes the current conduction path 36 when the drive command of the self-travel motor 32 is input in response to the self-travel switch 22 being turned to ON-state.

Consequently, if the first switching element 41 malfunctioned due to short circuit, the drive switch 21A is turned off in conjunction with the blade switch 21 being turned off to interrupt the first current conduction path 35; and if the second switching element 42 malfunctioned due to short circuit, the drive switch 22A is turned off in conjunction with the self-travel switch 22 being turned off to interrupt the second current conduction path 36. Therefore, even when the first and the second switching elements 41, 42 malfunctioned due to short circuit, the user can still stop the drive of the blade motor 31 or the self-travel motor 32 by respectively turning the blade switch 21 or the self-travel switch 22 to OFF-state.

A first turn-off-delay circuit 47 is disposed on an output path of the PWM signal from the control circuit 50 to the first switching element 41. A second turn-off-delay circuit 48 is disposed on an output path of the PWM signal from the control circuit 50 to the second switching element 42. The first and the second turn-off-delay circuits 47, 48 makes a turn-off time, in which the first and the second switching elements 41, 42 are turned from ON-state to OFF-state in response to the PWM signal, longer than a turn-on time, in which the first and the second switching elements 41, 42 are turned from OFF-state to ON-state in response to the PWM signal.

Specifically, the first turn-off-delay circuit 47 includes a resistor R12 disposed on the output path of the PWM signal from the control circuit 50 to the first switching element 41, and a series circuit including a resistor R13 and a diode D11 coupled in parallel with the resistor R12. The diode D11 is arranged such that a direction of electric current that flows from the control circuit 50 to the gate of the first switching element 41 is directed forward when the PWM signal rises from a low level to a high level.

Therefore, the electric current that flows into the gate of the first switching element 41 from the control circuit 50 when the PWM signal rises to a high level is greater than the electric current that flows out of the gate of the first switching element 41 to the controller 50 when the PWM signal is weakened to a low level. Accordingly, the turn-off time, in which the first switching element 41 turns from ON-state to OFF-state in response to the PWM signal being weakened to a low level, is longer than the turn-on time, in which the first switching element 41 turns from OFF-state to ON-state in response to the PWM signal rising to a high level.

The second turn-off-delay circuit 48 includes a resistor R22 disposed on the output path of the PWM signal from the control circuit 50 to the second switching element 42, and a series circuit including a resistor R23 and a diode D21 coupled in parallel with the resistor R22. Similarly to the diode 11 of the first turn-off-delay circuit 47, the diode D21 is arranged such that a direction of electric current that flows from the control circuit 50 to the gate of the second switching element 42 is directed forward when the PWM signal rises. Accordingly, the turn-off time, in which the second switching element 42 turns from ON-state to OFF-state, is longer than the turn-off time, in which the second switching element 42 turns from OFF-state to ON-state.

The reason that the turn-off time of the first and the second switching elements 41, 42 is made longer than their turn-on time is to reduce the high-value peak voltage generated when the first and the second switching elements 41, 42 are turned off.

When the first and the second switching elements 41, 42 are turned from ON-state to OFF-state, a high voltage is generated at the terminals of the blade motor 31 and the self-travel motor 32 close to the first and the second switching elements 41, 42 by energy accumulated in the blade motor 31 and the self-travel motor 32. If this high-value peak voltage exceeds the dielectric withstanding voltages of the first and the second switching elements 41, 42, the first and the second switching elements 41, 42 are deteriorated and broken in some cases. In the present embodiment, this high-value peak voltage generated by energy accumulated in the blade motor 31 and the self-travel motor 32 is reduced by making the turn-off time of the first and the second switching elements 41, 42 longer, which protects the first and the second switching elements 41, 42 from high voltages.

The controller 30 includes a capacitor 37 for stabilizing the voltage of the third current conduction path 34 that receives electric power supply from the battery 8. The controller 30 also includes a power-supply circuit 38 that generates a power supply voltage Vcc in response to receiving electric power supply from the battery 8 via the third current conduction path 34.

The power supply voltage Vcc generated in the power-supply circuit 38 is a direct-current constant voltage that can drive the control circuit 50 and is supplied to the control circuit 50. The power supply voltage Vcc is also applied to the main power switch 20, the blade switch 21, and the self-travel switch 22 respectively via resistors R0, R1, R2. The power supply voltage Vcc is also applied to the variable resistor of the speed adjusting dial 24.

A connection point between the main power switch 20 and the resistor R0, a connection point between the blade switch 21 and the resistor R1, and a connection point between the self-travel switch 22 and the resistor R2 are each coupled to the control circuit 50. A slider of the variable resistor of the speed adjusting dial 24 is also coupled to the control circuit 50. Therefore, the control circuit 50 can obtain ON-state and OFF-state of the main power switch 20, the blade switch 21, and the self-travel switch 22 as well as a command value (speed command value) of the travelling speed from the speed adjusting dial 24.

Figure 3:
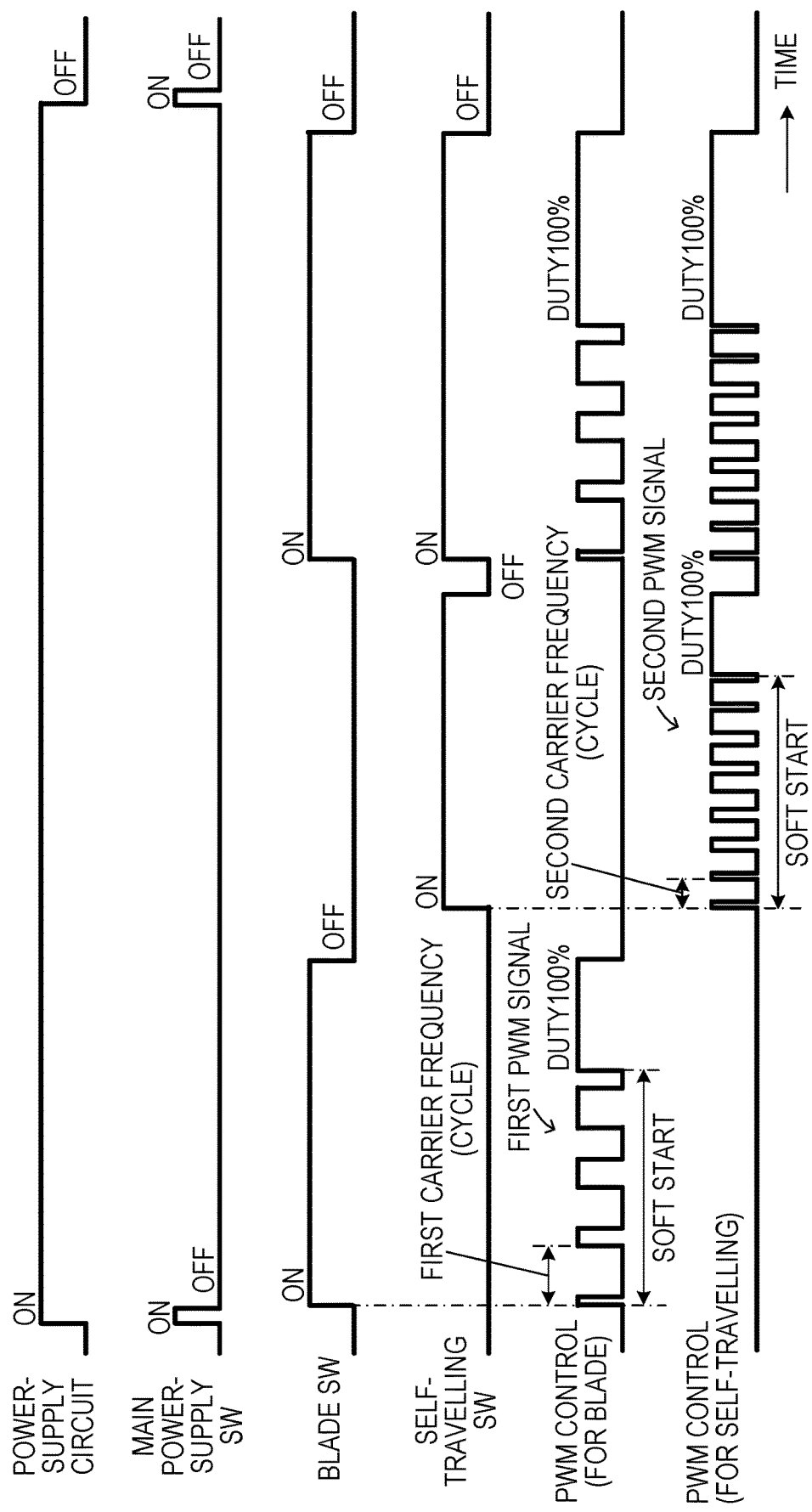
FIG. 3 is a time chart showing control operation of a blade motor and a self-travel motor when the blade motor and the self-travel motor are driven.
Figure 4:
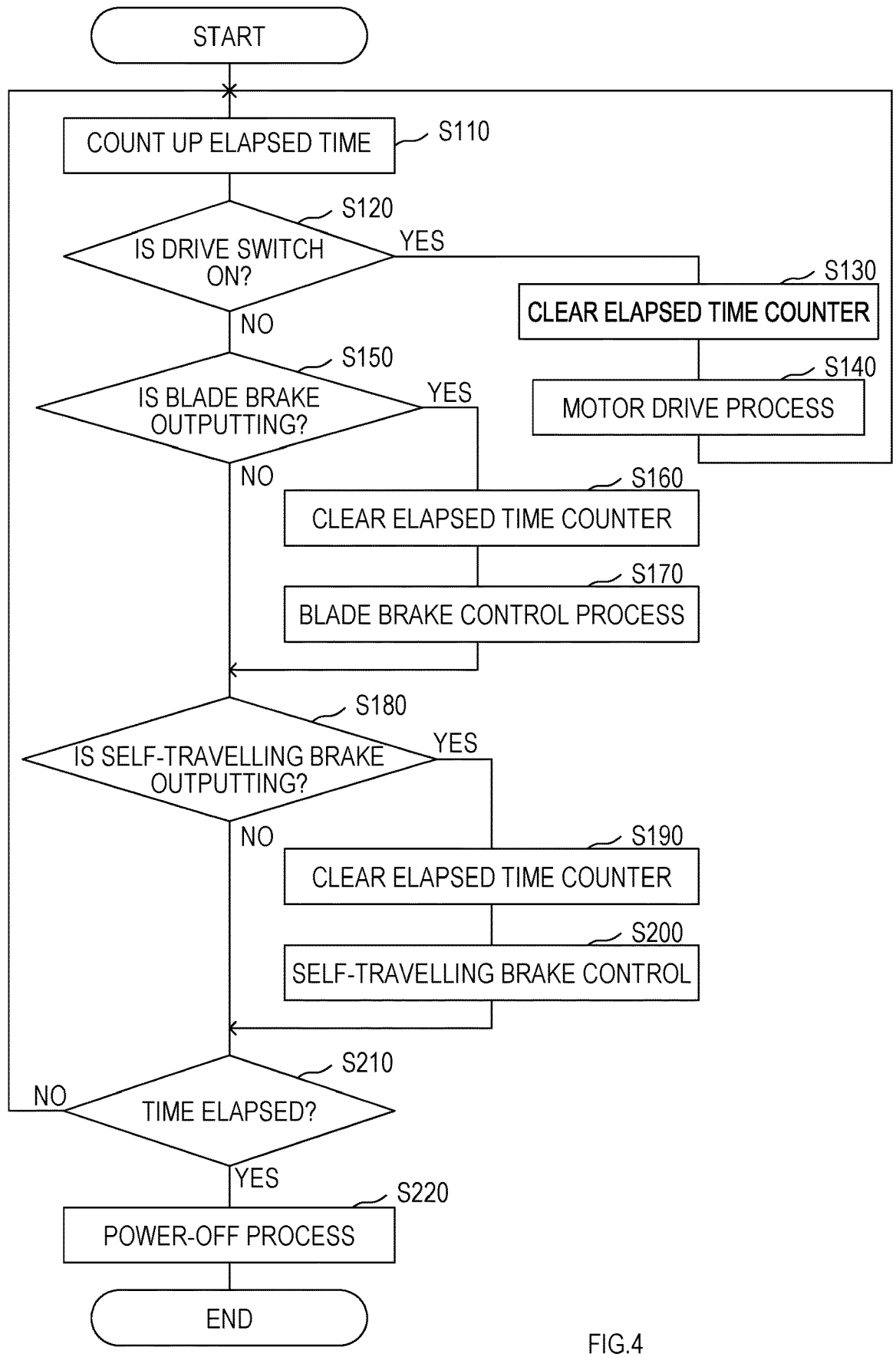
FIG. 4 is a flow chart showing a control process executed by a controller.

The connection point between the main power switch 20 and the resistor R0 is also coupled to the power-supply circuit 38. As shown in FIG. 3, the power-supply circuit 38 is activated or stopped every time the main power switch 20 is manipulated and turned to ON-state. In other words, since the main power switch 20 is turned to ON-state only when manipulated (pressed) by the user, the state of the power-supply circuit 38 is changed between ON-state and OFF-state every time the main power switch 20 is manipulated.

The controller 30 includes a display circuit 58 that turns on or off the LEDs arranged on the display 26 for various different displays. The control circuit 50 controls displayed state of the LEDs on the display 26 via this display circuit 58.

<Functional Configuration of Control Circuit>

The control circuit 50 is a micro control unit (MCU) including a CPU, a ROM, a RAM, and the like. The control circuit 50 achieves each function described in FIG. 2 by the CPU executing programs stored in the ROM.

In other embodiments, the control circuit 50 may include a combination of electronic components, such as a discrete element, or an application specific integrated circuit (ASIC) in place of or in addition to the MCU. The control circuit 50 may include an application specific standard product (ASSP), a programmable logic device such as a field programmable gate array (FPGA), or a combination of the above.

Functions of the control circuit 50 will be explained next.

As shown in FIG. 2, the control circuit 50 includes functions of a speed command determining device 52, an SW input determining device 54 (SW: switch), a display controller 56, a clock generator 60, a first divider 61, a second divider 62, a first PWM generator 65, a second PWM generator 66, and a motor drive controller 68.

The speed command determining device 52 obtains a voltage value, which is obtained by dividing the power supply voltage Vcc by the variable resistor of the speed adjusting dial 24, from the slider of the variable resistor and determines a speed command value of the travelling speed.

The SW input determining device 54 determines ON-state and OFF-state of the main power switch 20, the blade switch 21, and the self-travel switch 22 from electric potentials at the connection point between the main power switch 20 and the resistor R0, the connection point between the blade switch 21 and the resistor R1, and the connection point between the self-travel switch 22 and the resistor R2.

When the electric potential of the aforementioned connection point is low, the SW input determining device 54 determines that the corresponding switch 20, 21, or 22 is in ON-state; when the electric potential of the aforementioned connection point is high, the SW input determining device 54 determines that the corresponding switch 20, 21, or 22 is in OFF-state.

The clock generator 60 is a so-called oscillator that generates a reference clock for determining operation timing of the control circuit 50.

The first divider 61 sets a cycle of the first PWM signal, in other words, the first carrier frequency for PWM controlling electric power supply to the blade motor 31 by dividing the reference clock delivered from the clock generator 60.

The second divider 62 sets a cycle of the second PWM signal, in other words, the second carrier frequency for PWM controlling electric power supply to the self-travel motor 32 by dividing the reference clock delivered from the clock generator 60.

As shown in FIG. 3, when the blade switch 21 is in ON-state, the first PWM generator 65 generates the first PWM signal to PWM control the electric power supply to the blade motor 31 synchronously with the clock of the first carrier frequency delivered from the first divider 61.

When the self-travel switch 22 is in ON-state, the second PWM generator 66 generates the second PWM signal to PWM control the electric power supply to the self-travel motor 32 synchronously with the clock of the second carrier frequency delivered from the second divider 62.

When drive of the blade motor 31 and the self-travel motor 32 is commenced, the first PWM generator 65 and the second PWM generator 66 respectively set duty ratios of the first PWM signal and the second PWM signal to preset minimum values. The duty ratios of the first PWM signal and the second PWM signal are gradually increased at every cycle of the first PWM signal and the second PWM signal until the duty ratios reach respective target duty ratios.

This gradual increase is aimed to perform a so-called soft start, in which the rotational speeds of the blade motor 31 and the self-travel motor 32 are gradually increased after the drive of the motors is commenced. This soft start enables a smooth increase of rotational speeds of the cutting blade 18 and drive wheel 16 after the drive of the motors is commenced, which enables a reduction of uncomfortableness felt by the user due to steep rotational fluctuation when the speeds are increasing.

As shown in FIG. 3, the target duty ratio (DUTY) of the first PWM signal generated in the first PWM generator 65 is fixed at 100%. The blade motor 31 is thus controlled to rotate at its maximum rotational speed by the PWM signal with DUTY at 100%.

Meanwhile, the target duty ratio (DUTY) of the second PWM signal generated in the second PWM generator 66 is set at any duty ratio corresponding to the speed command value received from the speed adjusting dial 24 with the maximum value being 100% as shown in FIG. 3. Accordingly, the rotational speed of the self-travel motor 32 is controlled to be corresponding to the speed command value.

Since the blade motor 31 is a motor that drives the cutting blade 18, the load applied to the blade motor 31 from the cutting blade 18 when mowing the lawn is greater than the load applied to the self-travel motor 32 from the drive wheel 16 when the lawn mower 10 is traveling. Accordingly, the power consumption of the blade motor 31 is greater than the power consumption of the self-travel motor 32.

The first switching element 41 that is used to PWM control the electric power supply to the blade motor 31 is therefore likely to generate heat. The first switching element 41 may goes into an overheated state and malfunction if the carrier frequency of the PWM control is high.

Accordingly, the carrier frequency of the first PWM signal generated in the first PWM generator 65 is set at a frequency that can protect the first switching element 41 from overheating. Specifically, the first carrier frequency set in the first divider 61 is set at, for example, 500 Hz to protect the first switching element 41 from overheating.

The self-travel motor 32 is required to keep the rotational speed constant to make the lawn mower 10 travel stably. However, if the carrier frequency of a time when PWM controlling the electric power supply to the self-travel motor 32 is set at a low frequency likewise the blade motor 31, the electric current that flows to the self-travel motor 32 pulsates easily due to the switching operation of the second switching element 42. This pulsation is a so-called ripple. If the ripples significantly overlap with the electric current, irregularities of torque occur in the self-travel motor 32, which disables the lawn mower 10 from travelling stably.

The carrier frequency of the second PWM signal generated in the second PWM generator 66 is therefore set at a frequency higher than the first carrier frequency so that the self-travel motor 32 can make the lawn mower 10 travel stably. Specifically, the second carrier frequency set in the second divider 62 is set at, for example, 8 kHz to enable the lawn mower 10 to travel stably.

The motor drive controller 68 then outputs the first PWM signal and the second PWM signal generated as mentioned above in the first PWM generator 65 and the second PWM generator 66 respectively as a drive signal for the first switching element 41 and a drive signal for the second switching element 42.

As a consequence, the electric power supply to the blade motor 31 and the self-travel motor 32 is PWM controlled respectively by using the first PWM signal and the second PWM signal to respectively drive the blade motor 31 and the self-travel motor 32.

If the output of the first PWM signal or the second PWM signal is stopped in response to switching of the blade switch 21 or the self-travel switch 22 from ON-state to OFF-state, the motor drive controller 68 delivers a drive signal (hereinafter, brake signal) to the fourth and the fifth switching elements 45, 46.

The fourth and the fifth switching elements 45, 46 are turned to ON-state by the brake signal, deliver a brake current to the blade motor 31 or the self-travel motor 32, and generate a braking force. Accordingly, when the blade switch 21 or the self-travel switch 22 is turned from ON-state to OFF-state, the blade motor 31 or the self-travel motor 32 can be swiftly stopped.

In the present embodiment, the first divider 61 corresponds to one example of the first carrier frequency setting device in the present disclosure; and the second divider 62 corresponds to one example of the second carrier frequency setting device in the present disclosure. The first PWM generator 65, the second PWM generator 66, and the motor drive controller 68 correspond to examples of the controllers in the present disclosure.

<Process>

A control process executed in the control circuit 50 to achieve each of the aforementioned functions will be explained next with reference to the flow charts shown in FIG. 4 to FIG. 9.

This control process is performed by the CPU executing programs stored in the ROM when the control circuit 50 is in operation in response to the supply of the power supply voltage Vcc from the power-supply circuit 38.

Firstly, after initiation of the control process, elapsed time is measured in S110 (S: STEP) by counting up a counter for measuring the elapsed time. The elapsed time measured in S110 is a control-stop time, during which the control to drive or brake the blade motor 31 and the self-travel motor 32 is not executed.

In S120, it is determined whether a drive switch of the blade motor 31 or the self-travel motor 32, more specifically, the blade switch 21 or the self-travel switch 22, is in ON-state.

Figure 5:
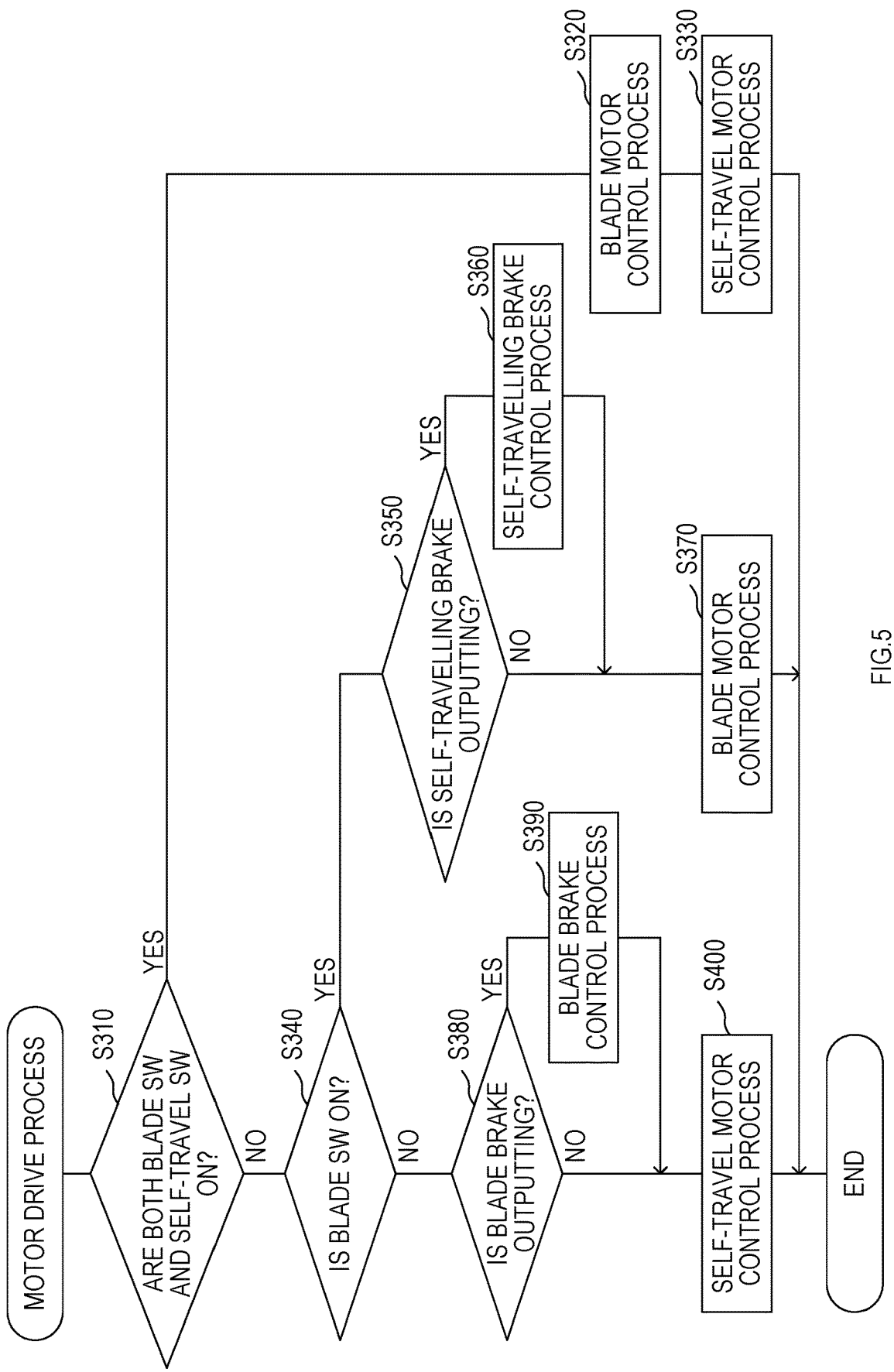
FIG. 5 is a flow chart showing a motor drive process shown in FIG. 4.

If it is determined in S120 that the drive switch of the blade motor 31 or the self-travel motor 32 is in ON-state, the process proceeds to S130. In S130, the counter for measuring the elapsed time is cleared, and the process proceeds to S140. In S140, a motor drive process shown in FIG. 5 is executed, and the process proceeds to S110. The motor drive process will be explained in detail later.

If it is determined in S120 that the drive switches of the blade motor 31 and the self-travel motor 32 are both in OFF-state, the process proceeds to S150. In S150, it is determined whether the blade motor 31 is currently being braked, more specifically, whether the brake signal is being delivered to the fourth switching element 45.

If it is determined in S150 that the blade motor 31 is currently being braked, the process proceeds to S160. If it is determined in S150 that the blade motor 31 is not currently being braked, the process proceeds to S180.

Figure 9:
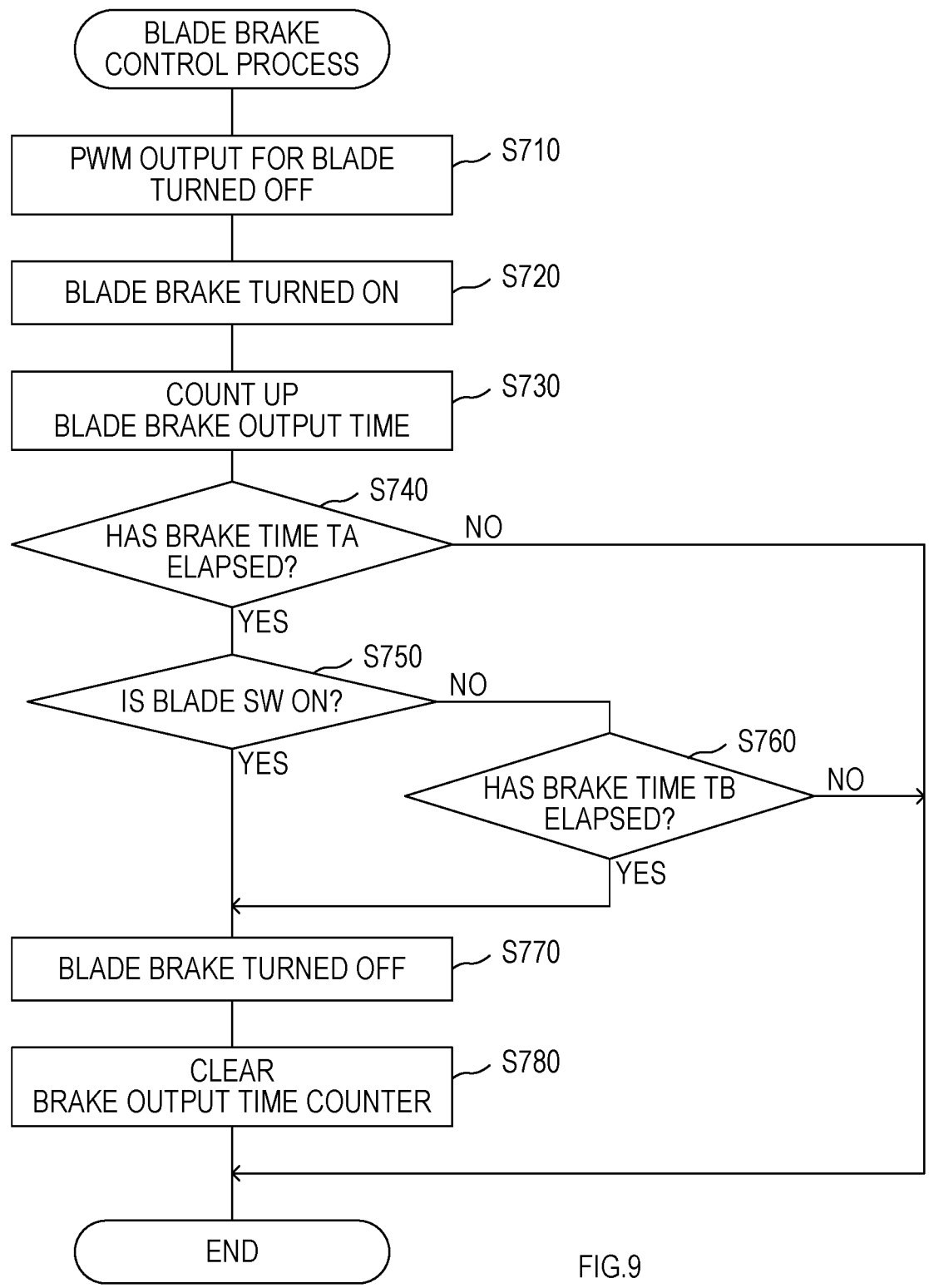
FIG. 9 is a flow chart showing a blade brake control process shown in FIGS. 4, 5, 6.

In S160, the counter for measuring the elapsed time is cleared, and the process proceeds to S170. In S170, a blade brake control process shown in FIG. 9 is executed, and the process proceeds to S180. The blade brake control process will be explained in detail later.

In S180, it is determined whether the self-travel motor 32 is currently being braked, more specifically, whether the brake signal is delivered to the fifth switching element 46.

If it is determined in S180 that the self-travel motor 32 is currently being braked, the process proceeds to S190. If it is determined in S180 that the self-travel motor 32 is not currently being braked, the process proceeds to S210.

Figure 8:
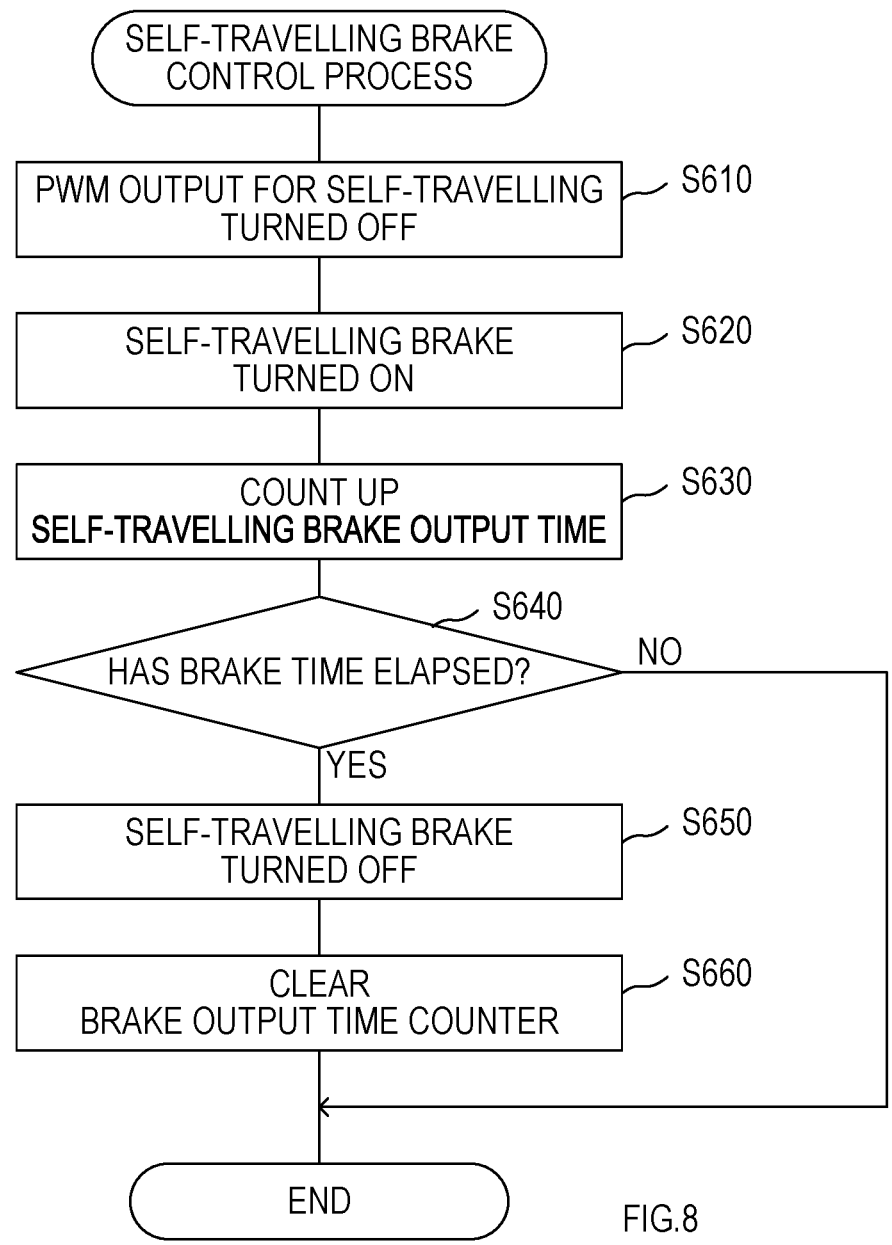
FIG. 8 is a flow chart showing a self-travelling brake control process shown in FIGS. 4, 5, 7.

In S190, the counter for measuring the elapsed time is cleared, and the process proceeds to S200. In S200, a self-travelling brake control process shown in FIG. 8 is executed, and the process proceeds to S210. The self-travelling brake control process will be explained in detail later.

In S210, it is determined whether a counter value of the counter for measuring the elapsed time, which is counted up in S110, has reached a preset threshold for determining elapsing of time. If the counter value of the counter for measuring the elapsed time has not reached the threshold, the process proceeds to S110 and the aforementioned series of processes is executed again.

If it is determined in S210 that the counter value of the counter for measuring the elapsed time has reached the threshold, the process proceeds to S220 and the control process is ended by executing a power-off process.

The power-off process is a process to cause the control circuit 50 to stop its operation when the aforementioned counter value reached the threshold, more specifically, when a control-stop time, during which a control to drive or brake the blade motor 31 and the self-travel motor 32 is not executed, has reached a specified waiting time. Thus, in S220, the control process is ended by stopping the operation of the power-supply circuit 38.

The motor drive process executed in S140 is explained next.

As shown in FIG. 5, in the motor drive process, it is determined first in S310 whether both of the blade switch 21 and the self-travel switch 22 are in ON-state. If both of the blade switch 21 and the self-travel switch 22 are in ON-state, the process proceeds to S320 to execute a blade motor control process shown in FIG. 6. After executing the blade motor control process in S320, the process proceeds to S330 to execute a self-travel motor control process shown in FIG. 7, and the motor drive process is ended.

If it is determined in S310 that both of the blade switch 21 and the self-travel switch 22 are not in ON-state, the process proceeds to S340 and determines whether the blade switch 21 is in ON-state.

Figure 6:
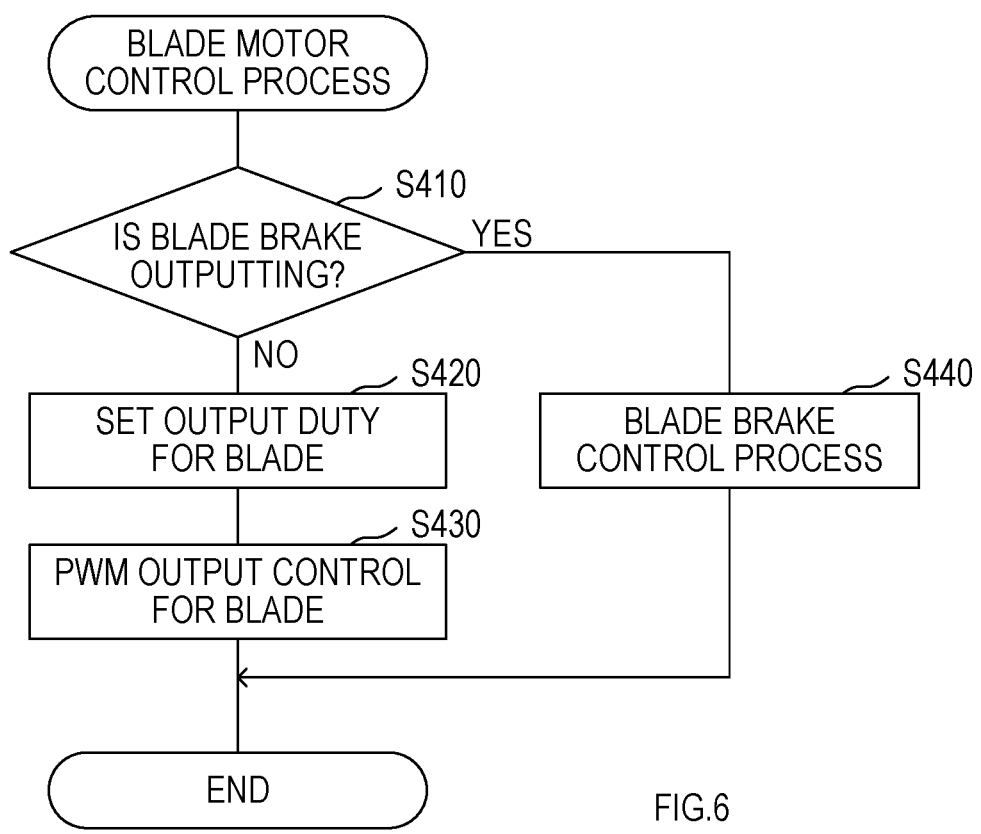
FIG. 6 is a flow chart showing a blade motor control process shown in FIG. 5.

If it is determined in S340 that the blade switch 21 is in ON-state, the process proceeds to S350 to determine whether the self-travel motor 32 is currently being braked. If it is determined in S350 that the self-travel motor 32 is currently being braked, the process proceeds to S360 to execute the self-travelling brake control process shown in FIG. 8 and proceeds to S370. If it is determined in S350 that the self-travel motor 32 is not currently being braked, the process proceeds to S370. In S370, the blade motor control process shown in FIG. 6 is executed, and the motor drive process is ended.

If it is determined in S340 that the blade switch 21 is not in ON-state, in other words, the self-travel switch 22 is in ON-state, the process proceeds to S380 and determines whether the blade motor 31 is currently being braked.

Figure 7:
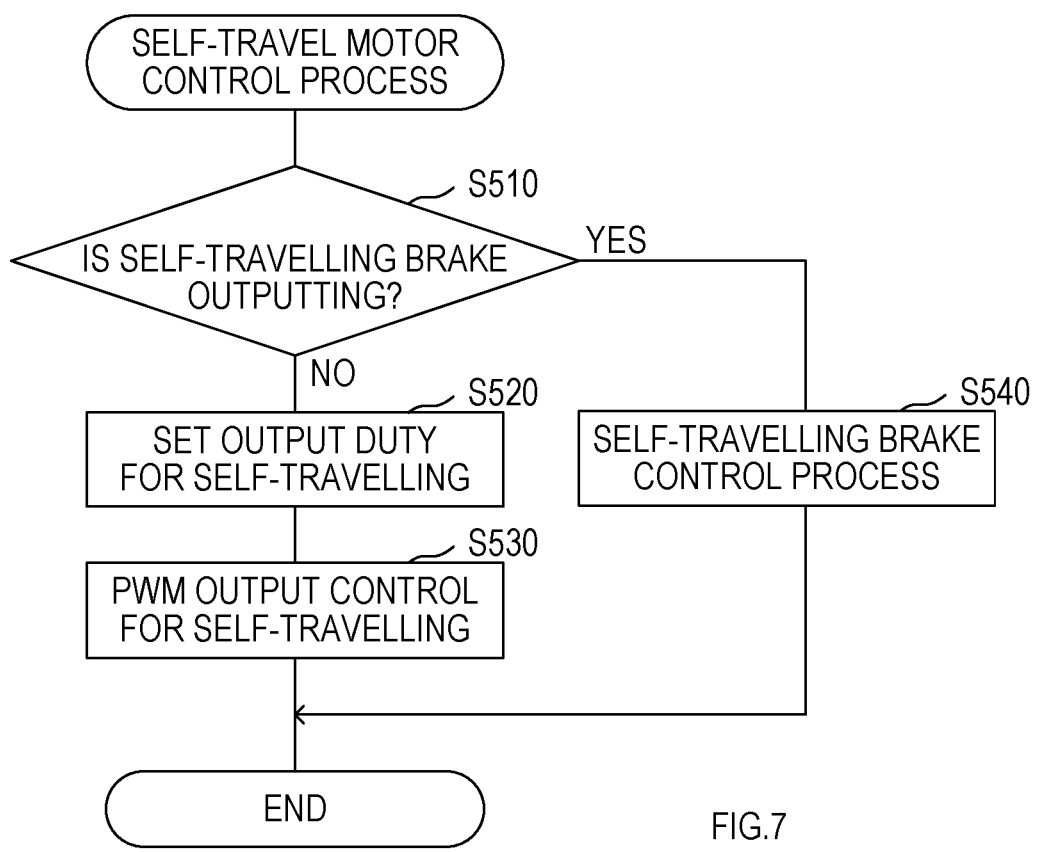
FIG. 7 is a flow chart showing a self-travel motor control process shown in FIG. 5.

If it is determined in S380 that the blade motor 31 is currently being braked, the process proceeds to S390 to execute the blade brake control process shown in FIG. 9 and proceeds to S400. If it is determined in S380 that the blade motor 32 is not currently being braked, the process proceeds to S400. In S400, the self-travel motor control process shown in FIG. 7 is executed, and the motor drive process is ended.

The blade motor control process executed in S320 or S370 and the self-travel motor control process executed in S330 or S400 are explained next.

As shown in FIG. 6, the blade motor control process begins with determining whether the blade motor 31 is currently being braked in S410. If it is determined that the blade motor 31 is currently being braked, the process proceeds to S440 to execute the blade brake control process shown in FIG. 9, and the blade motor control process is ended.

If it is determined in S410 that the blade motor 31 is not currently being braked, the process proceeds to S420 to set the duty ratio of the first PWM signal that is to be delivered to the first switching element 41.

Although the target duty ratio (DUTY) of the first PWM signal is fixed at 100%, in S420, the duty ratio is set such that the duty ratio approaches to the target duty ratio every single cycle of the first PWM signal to enable the aforementioned soft start.

In the subsequent S430, an output control of the PWM signal is executed, and then the blade motor control process is ended. Specifically, the output control of the PWM signal in this process is a control to generate the first PWM signal, which is pulse-width modulated by using the duty ratio set in S420, and to deliver the generated first PWM signal to the first switching element 41.

The cycle of the first PWM signal is a cycle of the first carrier frequency that is generated by dividing the reference clock in the first divider 61. In S430, the PWM signal with the duty ratio that is set synchronously with this cycle in S420 is delivered.

As shown in FIG. 7, the self-travel motor control process begins with determining whether the self-travel motor 32 is currently being braked in S510. If it is determined that the self-travel motor 32 is currently being braked, the process proceeds to S540 to execute the self-travelling brake control process shown in FIG. 8, and the self-travel motor control process is ended.

If it is determined in S510 that the self-travel motor 32 is not currently braked, the process proceeds to S520 to set the duty ratio of the second PWM signal that is to be delivered to the second switching element 42.

The target duty ratio (DUTY) of the second PWM signal is set in accordance with the speed command value from the speed adjusting dial 24. In S520, the duty ratio is set such that the duty ratio approaches to the target duty ratio every single cycle of the second PWM signal to enable the aforementioned soft start.

In the subsequent S530, an output control of the PWM signal is executed, and then the self-travel motor control process is ended. Specifically, the output control of the PWM signal in this process is a control to generate the second PWM signal, which is pulse-width modulated by using the duty ratio set in S520, and to deliver the generated second PWM signal to the second switching element 42.

The cycle of the second PWM signal is a cycle of the second carrier frequency that is generated by dividing the reference clock in the second divider 62. In S530, the PWM signal with the duty ratio that is set synchronously with this cycle in S520 is delivered.

The self-travelling brake control process executed in S200, S360, or S540 and the blade brake control process executed in S170, S390, or S440 will be explained next.

As shown in FIG. 8, the self-travelling brake control process begins with stopping delivery of the second PWM signal to the second switching element 42 to bring the second switching element 42 into OFF-state in S610.

In the subsequent S620, the brake signal is delivered to the fifth switching element 46 for self-travelling brake to bring the fifth switching element 46 into ON-state. As a consequence, the brake current flows through the self-travel motor 32 which generates the braking force.

In S630, output time (hereinafter, self-travelling brake time) of the brake signal towards the fifth switching element 46 is measured by counting up a counter for measuring self-travelling brake time.

In S640, it is determined whether the self-travelling brake time measured in S630 has reached brake time that is preset for determining termination of the self-travelling brake. A time required to stop the travelling of the lawn mower 10 by the self-travelling brake is preset as this brake time.

If it is determined in S640 that the self-travelling brake time has not reached the brake time for determining termination of the self-travelling brake, the self-travelling brake control process is ended.

If it is determined in S640 that the self-travelling brake time has reached the brake time for determining termination of the self-travelling brake, the process proceeds to S650. In S650, delivery of the brake signal to the fifth switching element 46 is stopped, and the brake control of the self-travel motor 32 is ended. In the subsequent S660, the counter for measuring the self-travelling brake time is cleared, and the self-travelling brake control process is ended.

As explained above, in the self-travelling brake control process, when the self-travel switch 22 is brought into OFF-state and thus the drive of the self-travel motor 32 is stopped, the braking force is generated in the self-travel motor 32 for a given length of time which corresponds to the brake time for determining termination of the self-travelling brake. Accordingly, the travelling of the lawn mower 10 can be stopped without fail.

As shown in FIG. 9, the blade brake control process begins with stopping the delivery of the first PWM signal to the first switching element 41 and bring the first switching element 41 into OFF-state in S710.

In the subsequent S720, the brake signal is delivered to the fourth switching element 45 for blade brake to bring the fourth switching element 45 into ON-state. As a consequence, brake current flows through the blade motor 31 which generates the braking force.

In S730, output time (hereinafter, blade brake time) of the brake signal towards the fourth switching element 45 is measured by counting up a counter for measuring blade brake time.

In S740, it is determined whether the blade brake time measured in S730 has reached a preset brake time TA. If it is determined in S740 that the blade brake time has not reached the brake time TA, the blade brake control process is ended. A time required for the rotation of the blade motor 31 to be decreased by the blade brake to sufficiently lower the brake current is set as the brake time TA.

If it is determined in S740 that the blade brake time has reached the brake time TA, the process proceeds to S750 to determine whether the blade switch 21 is in ON-state.

If it is determined in S750 that the blade switch 21 is in ON-state, the process proceeds to S770 and the brake control of the blade motor 31 is ended by terminating the delivery of the brake signal to the fourth switching element 45. In the subsequent S780, the counter for measuring the blade brake time is cleared, and the blade brake control process is ended.

If it is determined in S750 that the blade switch 21 is not in ON-state, the process proceeds to S760 to determine whether the blade brake time measured in S730 has reached a preset brake time TB. A time required for stopping the rotation of the blade motor 31 by using the blade brake is preset as the brake time TB. Accordingly, the brake time TB is longer than the brake time TA.

If it is determined in S760 that the blade brake time has not reached the brake time TB, the blade brake control process is ended. If it is determined in S760 that the blade brake time has reached the brake time TB, the brake control of the blade motor 31 is ended in S770. In S780, the counter for measuring the blade brake time is cleared, and the blade brake control process is ended.

Figure 10:
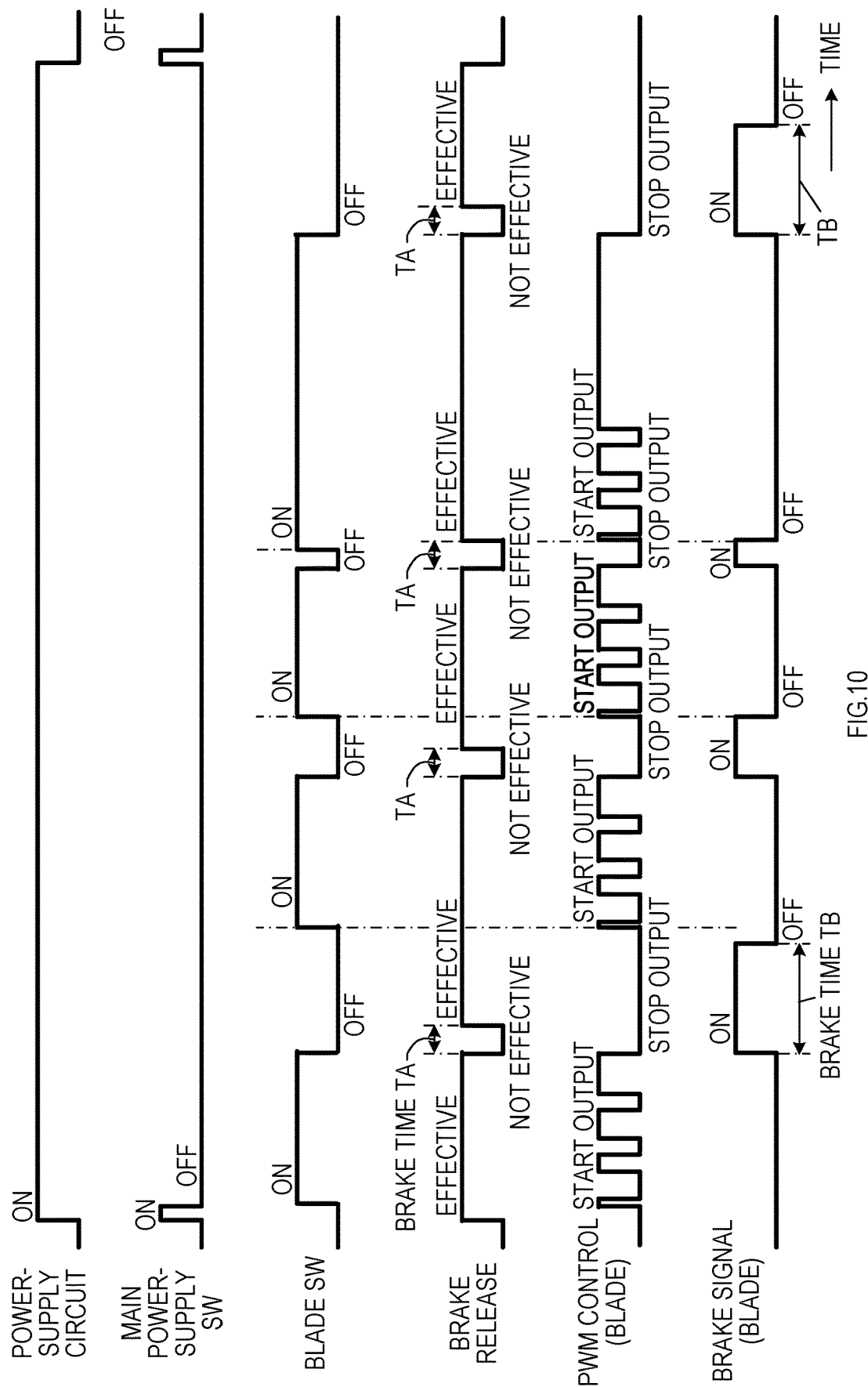
FIG. 10 is a time chart showing operation of the blade motor when break control is executed.

As explained above, in the blade brake control process, when the blade switch 21 is brought into OFF-state and thus the drive of the blade motor 31 is stopped, the brake signal is delivered to the fourth switching element 45 to generate the braking force in the blade motor 31 as shown in FIG. 10.

If the blade brake time for delivering the brake signal to the fourth switching element 45 has reached the brake time TB, it is determined that the rotation of the blade motor 31 is stopped. Then, the delivery of the brake signal is stopped and the brake control of the blade motor 31 is ended.

If the blade switch 21 is brought into ON-state before the blade brake time has reached the brake time TB, the delivery of the brake signal is stopped with a condition that the blade brake time has reached the brake time TA, which allows recommencement of the drive of the blade motor 31.

Therefore, if the user stops manipulation of the blade switch 21 when mowing lawns by manipulating the blade switch 21, he/she can resume mowing lawns by resuming manipulation of the blade switch 21 before the rotation of the blade motor 31 stops.

For example, in the blade brake control process, if the user stops manipulation of the blade switch 21 when mowing lawns by manipulating the blade switch 21, the braking force may be applied to the blade motor 31 until the rotation of the blade motor 31 stops. However, such configuration decreases usability of the lawn mower 10 for a user who wants to mow lawns by resuming the drive of the blade motor 31 in a state where the blade motor 31 is not yet stopped.

Meanwhile, in the present embodiment, the user can resume the drive of the blade motor 21 by manipulating the blade switch 21 even when the blade motor 31 is not stopped by the brake control if the brake control is executed for the brake time TA or longer. Therefore, the lawn mower 10 of the present embodiment enables efficient lawn mowing and improvement of usability for the user.

<Effect>

As it has been explained, in the lawn mower 10 of the present embodiment, the electric power supply to the blade motor 31 and the self-travel motor 32 is PWM controlled respectively by the first PWM signal and the second PWM signal generated respectively by the first carrier frequency and the second carrier frequency, whose frequencies are different from each other.

Accordingly, even though the drive of the blade motor 31 and the self-travel motor 32 are controlled by the common control circuit 50, the carrier frequency of a time when PWM controlling the electric power supply to these motors can be set individually for each motor. Therefore, the electric power supply to the blade motor 31 and the self-travel motor 32 can be PWM controlled individually at the carrier frequency suitable for each motor.

In other words, since the load applied to the blade motor 31 from the cutting blade 18 is large, the electric power supply to the blade motor 31 is greater than the electric power supply to the self-travel motor 32; and therefore, the electric current that flows through the first switching element 41 is greater than the electric current that flows through the second switching element 42.

Meanwhile, in the present embodiment, the first carrier frequency of a time when PWM controlling the first switching element 41 can be set at a frequency lower than the second carrier frequency. This enables a reduction of switching losses in the first switching element 41, which can inhibit overheating of the first switching element 41.

Furthermore, since it is not necessary to increase the dielectric withstanding voltage of the first switching element 41 to protect the first switching element 41 from malfunctions caused by overheating, it is possible to use an element that has a low dielectric withstanding voltage but is inexpensive as the first switching element 41. This enables a reduction of the cost of the lawn mower 10.

The second carrier frequency can be set higher than the first carrier frequency to be able to reduce the torque fluctuation of the self-travel motor 32. Accordingly, the lawn mower 10 of the present embodiment can stably travel at a desired speed.

In addition, in the lawn mower 10 of the present embodiment, the first and the second switching elements 41, 42, which are used to PWM control the electric power supply to the blade motor 31 and the self-travel motor 32, are configured such that their turn-off time is longer than the turn-on time.

Accordingly, it is possible to protect the first and the second switching elements 41, 42 from a high voltage by reducing the high-value peak voltage generated when turning off the first and the second switching elements 41, 42.

Other Embodiments

Although the embodiment of the present disclosure has been explained above, the present disclosure may be implemented in various forms without being limited to the aforementioned embodiment.

In the aforementioned embodiment, it is explained that the first carrier frequency of a time when PWM controlling the electric power supply to the blade motor 31 is 500 Hz. Nevertheless, the first carrier frequency may be set within a range between 100 Hz and 1 kHz.

In the aforementioned embodiment, the second carrier frequency of a time when PWM controlling the electric power supply to the self-travel motor 32 is 8 kHz. Nevertheless, the second carrier frequency may be set within a range between 8 kHz and 20 kHz.

In other words, if the carrier frequency is set within a frequency region between 1 kHz and 8 kHz when PWM controlling the electric power supply to the motors, the switching noise generated by turning on and of the switches may be heard by a person in the surroundings such as the user.

However, if the first carrier frequency and the second carrier frequency are set within the aforementioned frequency ranges, it is possible to inhibit the switching noise generated when PWM controlling the electric power supply to the motors from being heard by the user and the like, which enables a reduction of uncomfortableness felt by the user.

Particularly, the first carrier frequency may be set within a range between 300 Hz and 700 Hz; and the second carrier frequency may be set within a range between 8 kHz and 10 kHz.

In the aforementioned embodiment, it is explained that the first carrier frequency and the second carrier frequency are set by dividing the reference clock in the control circuit 50. Nevertheless, the first carrier frequency and the second carrier frequency may also be set by multiplying the reference clock.

Alternatively, an oscillator that generates a clock signal of the first carrier frequency or the second carrier frequency may be provided; and by dividing or multiplying an output from the oscillator, a clock signal having a carrier frequency different from thus generated clock signal may be generated.

In the aforementioned embodiment, the lawn mower 10 is described. Nevertheless, the configuration of the aforementioned embodiment can be applied to electric work machines that include two or more motors for different uses, for example, a reinforcing steel binding machine having a motor for binding reinforcing steels and a motor for transferring wires for binding. In addition, the configuration of the aforementioned embodiment can also be applied to self-travelling work machines, for example, a hand cart, a cultivator, and a floor cleaning machine.

In the aforementioned embodiment, examples are provided where the blade motor 31 and the self-travel motor 32 are both brushed motors. Nevertheless, one or both of the blade motor 31 and the self-travel motor 32 may be brushless motors. In other words, the two motors of the present disclosure may be any motors as long as the electric power supply thereto can be PWM controlled.

Two or more functions of one element in the aforementioned embodiments may be achieved by two or more elements, and one function of one element may be achieved by two or more elements. In addition, two or more functions of two or more elements may be achieved by one element, and one function of two or more elements may be achieved by one element. A part of the configurations in the aforementioned embodiments may be omitted. Furthermore, at least a part of the configurations of the aforementioned embodiments may be added to or replaced with another configuration of the aforementioned embodiments.

Other than the electric work machines, the present disclosure may be embodied in various forms, for example, a system that includes the electric work machine as an element; a program that makes a computer function as the electric work machine; a non-transitory tangible recording medium, such as a semiconductor memory, that stores the program; and a control method.

What is claimed is:

1. An electric work machine comprising:
   a first motor configured to drive a first drive object;
   a second motor configured to drive a second drive object;
   a first current conduction path configured to couple a direct-current power source to the first motor;
   a second current conduction path configured to couple the direct-current power source to the second motor;
   a first switch disposed on the first current conduction path;
   a second switch disposed on the second current conduction path;
   a first carrier frequency setting device configured to set a first carrier frequency at a time when a first PWM signal controls electric power supplied to the first motor by turning on and off the first switch;
   a second carrier frequency setting device configured to set a second carrier frequency at a time when a second PWM signal controls electric power supplied to the second motor by turning on and off the second switch such that the second carrier frequency is different from the first carrier frequency; and,
   a controller configured to control electric power supplied to the first motor by generating the first PWM signal at the first carrier frequency and delivering the first PWM signal to the first switch in response to an input of a first motor drive command, and control electric power supplied to the second motor by generating the second PWM signal at the second carrier frequency and delivering the second PWM signal to the second switch in response to an input of a second motor drive command,
   wherein the electric work machine comprises a lawn mower.

2. The electric work machine according to claim 1,
   wherein the first carrier frequency is set lower than the second carrier frequency.

3. The electric work machine according to claim 2,
   wherein the first drive object is a blade, and
   wherein the first motor is configured to rotate the blade.

4. The electric work machine according to claim 3,
   wherein the second drive object is a wheel that enables the electric work machine to travel, and
   wherein the second motor is configured to rotate the wheel.

5. The electric work machine according to claim 4,
   wherein the first carrier frequency is set within a range between 100 Hz and 1 kHz.

6. The electric work machine according to claim 5,
   wherein the first carrier frequency is set within a range between 300 Hz and 700 Hz.

7. The electric work machine according to claim 5,
   wherein the second carrier frequency is set within a range between 8 kHz and 20 kHz.

8. The electric work machine according to claim 7,
   wherein the second carrier frequency is set within a range between 8 kHz and 10 kHz.

9. The electric work machine according to claim 1,
   wherein the first switch and/or the second switch is configured such that a turn-off time, during which a state thereof changes from ON-state to OFF-state by the first PWM signal and/or the second PWM signal, is longer than a turn-on time, during which the state changes from the OFF-state to the ON-state.

* * * * *